(12) United States Patent
Otsuki

(10) Patent No.: US 11,921,408 B2
(45) Date of Patent: Mar. 5, 2024

(54) PROJECTION DEVICE AND PROJECTION SYSTEM WITH SUSPENDING ATTACHMENT

(71) Applicant: SEIKO EPSON CORPORATION, Tokyo (JP)

(72) Inventor: Nobuyuki Otsuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/533,246

(22) Filed: Nov. 23, 2021

(65) Prior Publication Data
US 2022/0171261 A1    Jun. 2, 2022

(30) Foreign Application Priority Data
Nov. 30, 2020  (JP) ................. 2020-198130

(51) Int. Cl.
*G03B 21/14*    (2006.01)
*G03B 21/16*    (2006.01)
*G03B 21/20*    (2006.01)

(52) U.S. Cl.
CPC ........... *G03B 21/145* (2013.01); *G03B 21/16* (2013.01); *G03B 21/2033* (2013.01)

(58) Field of Classification Search
CPC ... G03B 21/145; G03B 21/16; G03B 21/2033
See application file for complete search history.

(56) References Cited

U.S. PATENT DOCUMENTS

| 7,967,453 | B2 * | 6/2011 | Adachi | G03B 21/2066 353/100 |
|---|---|---|---|---|
| 8,454,174 | B2 * | 6/2013 | Nakano | G03B 21/14 248/176.1 |
| 9,400,417 | B2 * | 7/2016 | Nakano | G03B 21/14 |
| 9,618,832 | B2 * | 4/2017 | Nakano | F16M 13/02 |
| 10,018,897 | B2 * | 7/2018 | Nakano | G03B 21/14 |
| 10,151,969 | B2 * | 12/2018 | Otsuki | G03B 21/14 |
| 10,394,109 | B2 * | 8/2019 | Nakano | G03B 21/28 |
| 11,237,468 | B2 * | 2/2022 | Zhao | G03B 33/08 |
| 2010/0171938 | A1 * | 7/2010 | Amano | G03B 21/147 353/119 |
| 2010/0321644 | A1 * | 12/2010 | Otsuki | G03B 21/147 353/98 |
| 2010/0321646 | A1 * | 12/2010 | Nakano | G03B 21/14 353/119 |
| 2011/0157555 | A1 * | 6/2011 | Mashitani | G03B 35/16 353/7 |

(Continued)

FOREIGN PATENT DOCUMENTS

JP      2013041133 A  *  2/2013
WO  WO2019/207787       10/2019

*Primary Examiner* — Bao-Luan Q Le
(74) *Attorney, Agent, or Firm* — Dority & Manning, P.A.

(57) ABSTRACT

A projection device according to the present disclosure includes a light source unit, an image formation unit, a projection optical unit, and a housing which has a first surface and a second surface opposed to each other, and is configured to house the light source unit, the image formation unit, and the projection optical unit, wherein the first surface includes a first region, and a second region lower in height from the second surface than the first region, and a receiving part on which a suspending attachment is mounted is disposed in the second region.

15 Claims, 10 Drawing Sheets

(56) References Cited

U.S. PATENT DOCUMENTS

| | | | | |
|---|---|---|---|---|
| 2012/0256525 A1* | 10/2012 | Li | ............ | G03B 21/54 |
| | | | | 312/10.1 |
| 2012/0307214 A1* | 12/2012 | Koyama | ............ | G03B 21/28 |
| | | | | 353/98 |
| 2013/0250252 A1* | 9/2013 | Nakano | ............ | G03B 21/145 |
| | | | | 353/79 |
| 2014/0192332 A1* | 7/2014 | Koyama | ............ | H04N 9/31 |
| | | | | 353/119 |
| 2015/0163468 A1* | 6/2015 | Otsuki | ............ | G03B 21/28 |
| | | | | 353/70 |
| 2016/0306267 A1* | 10/2016 | Nakano | ............ | G03B 21/14 |
| 2016/0342074 A1* | 11/2016 | Nakano | ............ | F16M 13/02 |
| 2018/0292736 A1* | 10/2018 | Nakano | ............ | G03B 21/14 |
| 2020/0401027 A1* | 12/2020 | Zhao | ............ | G03B 21/2033 |
| 2021/0033951 A1 | 2/2021 | Okamoto | | |

* cited by examiner

PROJECTION DEVICE AND PROJECTION SYSTEM WITH SUSPENDING ATTACHMENT

The present application is based on, and claims priority from JP Application Serial Number 2020-198130, filed Nov. 30, 2020, the disclosure of which is hereby incorporated by reference herein in its entirety.

BACKGROUND

1. Technical Field

The present disclosure relates to a projection device and a projection system.

2. Related Art

As an installation configuration of a projector, in the past, there has been known a configuration in which the projector is installed on a desk with a projection lens facing to a projection target surface such as a screen, and a configuration in which the projector is installed so as to be suspended from the ceiling or a wall surface with a main body of the projector vertically flipped from the configuration described above. In the present specification, the former configuration is referred to as "standing," and the latter configuration is referred to as "suspended." When installing the projector in a suspended state, it is common to use a method of fixing the main body of the projector to the ceiling or the wall surface via a suspending attachment.

For example, in International Patent Publication No. WO 2019/207787 (Document 1), there is disclosed a projector provided with a housing having a plurality of attaching sections, a suspending metal plate disposed inside the housing, suspending brackets for fixing the housing to the wall surface or the ceiling, and fixation members, and having a configuration in which the suspending metal plate is fixed to the suspending brackets via the fixation members in the attaching sections.

However, in the projector according to Document 1, since the suspending brackets are visible in the exterior view, the appearance is poor, and the projector fails to fit into the atmosphere of the installation space in some cases.

SUMMARY

In view of the problems described above, a projection device according to an aspect of the present disclosure includes a light source unit, an image formation unit, a projection optical unit, and a housing which has a first surface and a second surface opposed to each other, and is configured to house the light source unit, the image formation unit, and the projection optical unit, wherein the first surface includes a first region, and a second region lower in height from the second surface than the first region, and a receiving part on which a suspending attachment is mounted is disposed in the second region.

A projection system according to an aspect of the present disclosure includes the projection device according to the above aspect of the present disclosure, and the suspending attachment configured to suspend the projection device.

A projection system according to another aspect of the present disclosure includes the projection device according to the above aspect of the present disclosure, and a suspending attachment configured to suspend the projection device, wherein the suspending attachment includes a first support part to be coupled to the receiving part disposed in the second region, and a second support part which crosses the first support part, and is disposed on the receiving part disposed in a fourth region.

DESCRIPTION OF EXEMPLARY EMBODIMENTS

First Embodiment

A first embodiment of the present disclosure will hereinafter be described using FIG. 1 through FIG. 6.

Figure 1:
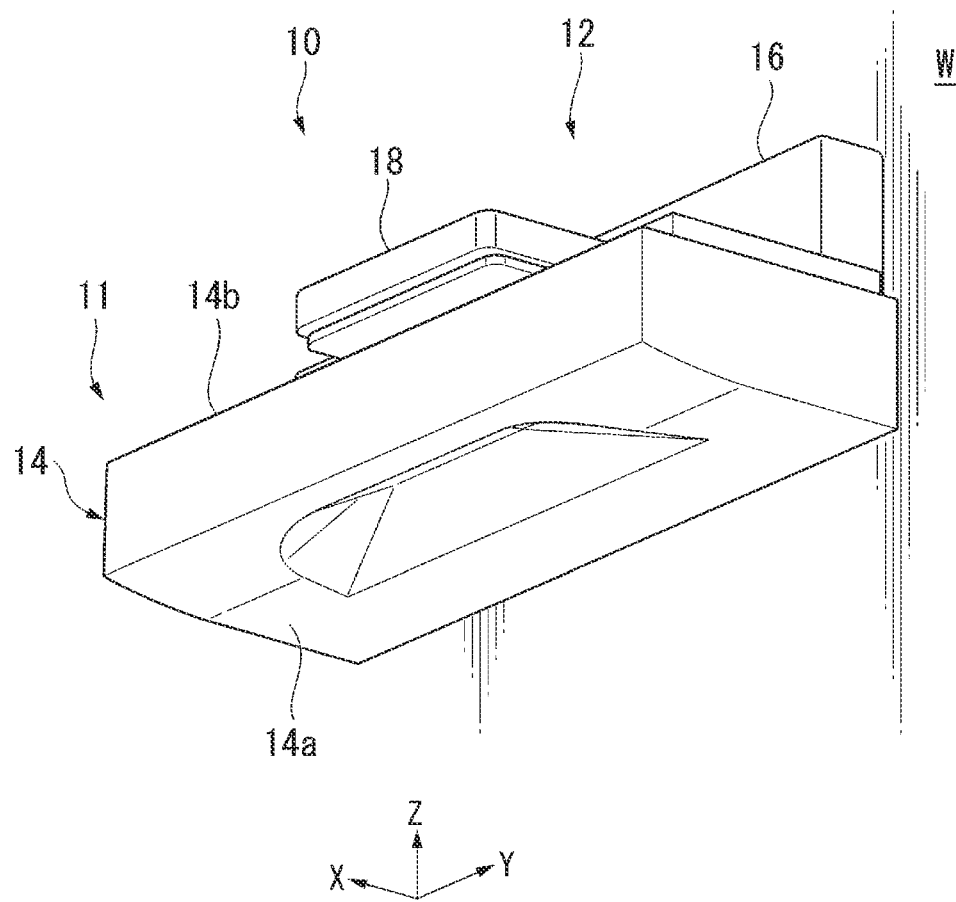
FIG. 1 is a perspective view showing an installation state of a projector according to a first embodiment.
Figure 2:
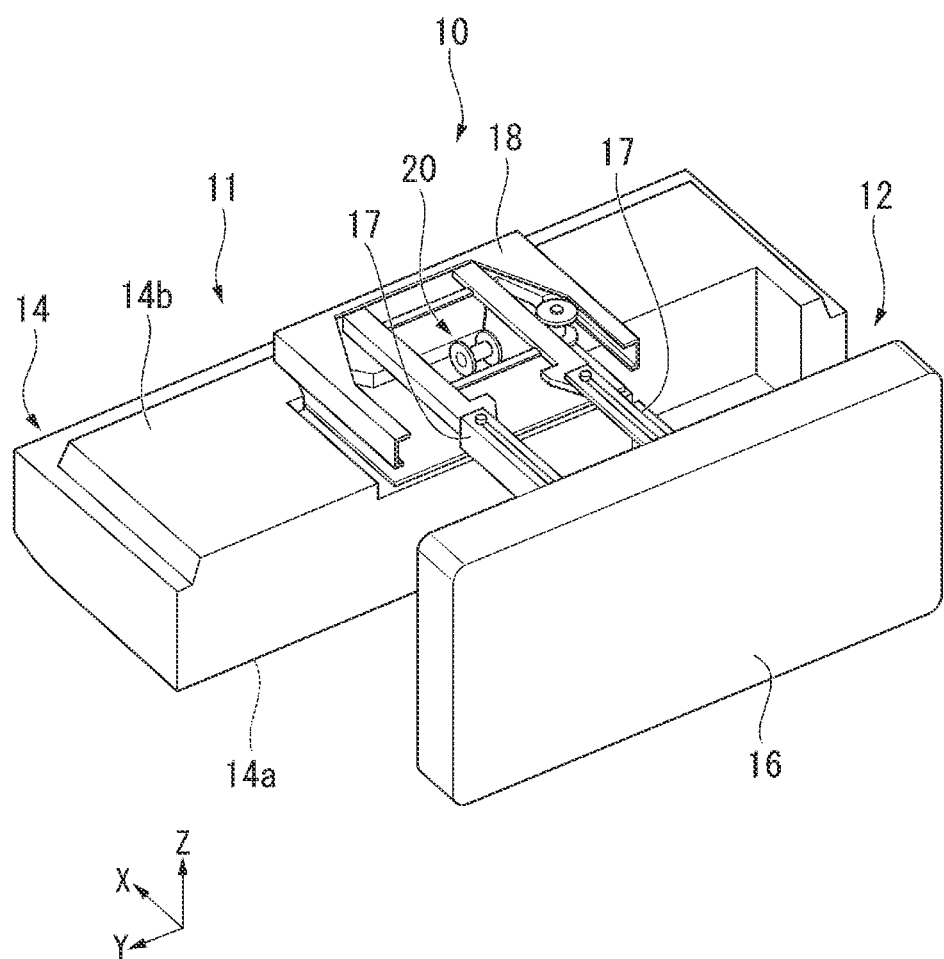
FIG. 2 is a perspective view showing a mounting structure of the projector with a suspending attachment.

FIG. 1 is a perspective view of a projection system 10 showing an installation state of a projector 11 according to the present embodiment, and shows a state of looking up the projector 11 from below. FIG. 2 is a perspective vies showing a mounting structure of the projector 11 with a suspending attachment 12, and shows a state of looking down the projector 11 from above.

It should be noted that in each of the drawings described below, the constituents are shown with the scale ratios of respective sizes set differently between the constituents in some cases in order to make each of the constituents eye-friendly.

In the drawings used for the following description, there is used an XYZ orthogonal coordinate system as needed.

An X axis is an axis obtained by projecting a light axis of light emitted from a projection optical unit 27 when viewing the projector 11 from above, and is an axis along a front-back direction. A Z axis is an axis which is perpendicular to the X axis, and extends along a vertical direction. A Y axis is an axis which is perpendicular to the X axis and the Z axis, and extends along a horizontal direction. In the present embodiment, the description will be presented defining a front side as a +X side, a back side as a −X side, an upper side as a +Z side, a lower side as a −Z side, a right side as a +Y side, and a left side as a −Y side viewed from an observer. It should be noted that the X axis can be defined as a direction in which a front surface 14c and a back surface 14d of a housing 14 described later are opposed to each other, the Y axis can be defined as a direction in which a right side surface 14e and a left side surface 14f of the housing 14 are opposed to each other, and the Z axis can be defined as a direction in which a top surface 14*a* and a bottom surface 14*b* of the housing 14 are opposed to each other.

The projector 11 is made installable in both of the standing configuration and the suspended configuration. In the present embodiment, as shown in FIG. 1 and FIG. 2, the projector 11 is installed on a wall surface W via the suspending attachment 12 in a posture flipped from the case of the standing configuration. Specifically, the projector 11 is installed on the wall surface W in a posture in which the top surface 14*a* of the housing 14 points downward, and the bottom surface 14*b* points upward.

The projector 11 is an ultrashort focal distance type projector, and projects an image on a projection target surface such as a screen disposed at a lower position than the position of the projector on the wall surface W on which the suspending attachment 12 is installed. The suspending attachment 12 has a function capable of fine-adjusting the position and the posture of the projector 11 by changing a distance between the projector 11 and the wall surface W, a tilt of the projector 11, and so on to thereby optimize the projection image. It should be noted that when being fixed to, for example, a mobile board or the like, the suspending attachment 12 is not required to be provided with a mechanism or a control function for the fine adjustment of the position and the posture of the projector 11.

In the case of the present embodiment, as shown in FIG. 2, the suspending attachment 12 is provided with a variety of adjusting components necessary for the adjustment of the position and the posture and so on of the projector 11. Specifically, the suspending attachment 12 has a support plate 16 to be fixed to the wall surface W, a slide arm 17 expanding and contracting in a front-back direction, a head part 18 disposed at a front portion of the slide arm 17, and a bracket base 19 (see FIG. 3) disposed on a lower surface of the head part 18. As described above, the head part 18 incorporates a variety of adjusting components 20. Further, the adjustment of the position, the posture, and so on of the projector 11 can be corrected using electronic control.

In the present embodiment, a whole system obtained by combining the projector 11 and the suspending attachment 12 for suspending the projector 11 is referred to as the projection system 10. In other words, the projection system 10 is provided with the projector 11 and the suspending attachment 12 for suspending the projector 11.

The projector 11 according to the present embodiment corresponds to a projection device in the appended claims. The projection system 10 according to the present embodiment corresponds to a projection system in the appended claims.

Figure 3:
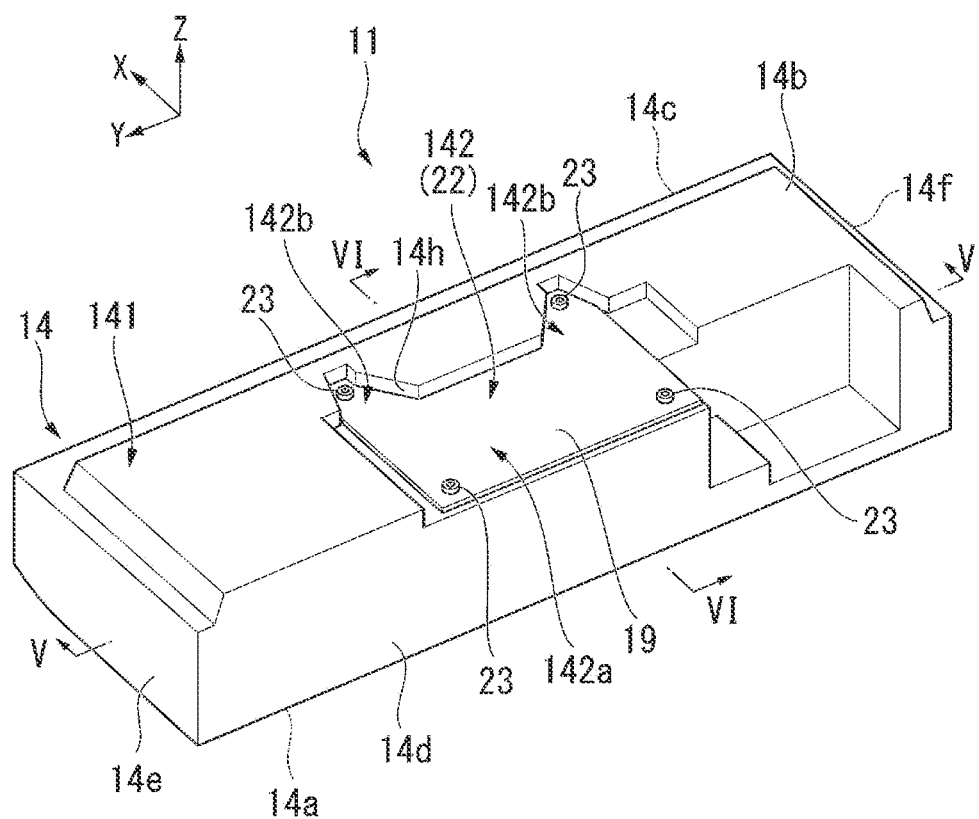
FIG. 3 is a perspective view of the projector.

FIG. 3 is a perspective view showing a state in which the bottom surface 14*b* of the housing 14 of the projector 11 is looked down from above.

As shown in FIG. 3, the projector 11 is provided with a light source unit 25 (see FIG. 4), an image formation unit 26 (see FIG. 4), a projection optical unit 27 (see FIG. 4), a control unit 28 (see FIG. 4), and the housing 14 for housing the light source unit 25, the image formation unit 26 and the projection optical unit 27. Configurations of the light source unit 25, the image formation unit 26, the projection optical unit 27, and the control unit 28 will be described later.

The housing 14 is a member which has a substantially rectangular solid shape, and is shaped like a hollow box. The housing 14 has six surfaces consisting of the top surface 14*a*, the bottom surface 14*b*, the front surface 14*c*, the back surface 14*d*, the right side surface 14*e*, and the left side surface 14*f*. It should be noted that regarding the names of the surfaces of the housing 14, the surface which is directed upward when installing the projector 11 in the standing posture is referred to as the top surface 14*a*, and the surface directed downward is referred to as the bottom surface 14*b*. Further, when viewed from the observer, the surface located at the front side is referred to as the front surface 14*c*, the surface located at the back side is referred to as the back surface 14*d*, the side surface located at the right side is referred to as the right side surface 14*e*, and the side surface located at the left side is referred to as the left side surface 14*f*.

The bottom surface 14*b* in the present embodiment corresponds to a first surface in the appended claims. The top surface 14*a* in the present embodiment corresponds to a second surface in the appended claims.

The bottom surface 14*b* is provided with a recessed part 14*h*. Thus, the bottom surface 14*b* has a first region 141 corresponding to a portion other than the recessed part 14*h*, and a second region 142 which corresponds to the recessed part 14*h*, and is lower in height from the top surface 14*a* than the first region 141. It should be noted that the top surface 14*a* can be an entirely flat surface, can be a surface having an asperity, or can also be an entirely convex curved surface. When the top surface 14*a* has the asperity, the height to the bottom surface 14*b* based on a portion which occupies the largest area except the asperity out of the top surface 14*a* is defined as the height from the top surface 14*a*. In the case of the entirely convex curved shape, the height to the bottom surface 14*b* based on the first region 141 corresponding to the periphery of the recessed part 14*h* out of the top surface 14*a* is defined as the height from the top surface 14*a*. Further, a vertical direction of the first surface as the bottom surface 14*b* and the second surface as the top surface 14*a* is defined as a height direction as the Z-axis direction.

In the second region 142, there is disposed a receiving part 22 on which the suspending attachment 12 is mounted. In FIG. 3, the bracket base 19 of the suspending attachment 12 is fixed to the receiving part 22 of the second region 142 with fixation members 23. The second region 142 is disposed in a substantially central portion in a longitudinal direction of the housing 14, namely a horizontal direction. The first region 141 is disposed at a right side (+Y side), a left side (−Y side), and a front side (+X side) with respect to the second region 142. Further, the second region 142 has a shape constituted by a rectangular part 142*a*, and two protruding parts 142*b* protruding from the vicinity of each of the corner portions ahead of the rectangular part 142*a* at the right and left sides frontward so as to form triangular shapes. It should be noted that the shapes of the two protruding parts 142*b* are not limited to the triangular shapes.

The bracket base 19 has a shape substantially coinciding with the rectangular part 142*a* and the two protruding parts 142*b* of the second region 142. The bracket base 19 is fixed to the bottom surface 14*b* of the housing 14 with the fixation members 23 at four places, namely the vicinity of the right rear corner portion of the rectangular part 142*a*, the vicinity of the left rear corner portion thereof, the right front protruding part 142*b*, and the left front protruding part 142*b*. As the fixation members 23, there are used screws, for example, but this is not a limitation. Further, the number and the arrangement of the fixation places of the bracket base 19 are not particularly limited. Further, it is possible to fix the bracket base 19 after slidably adjusting the bracket base 19 in a horizontal direction. In that case, the bracket base 19 is not required to coincide with the shape constituted by the rectangular part 142*a* and the two protruding parts 142*b* of the second region 142.

Figure 4:
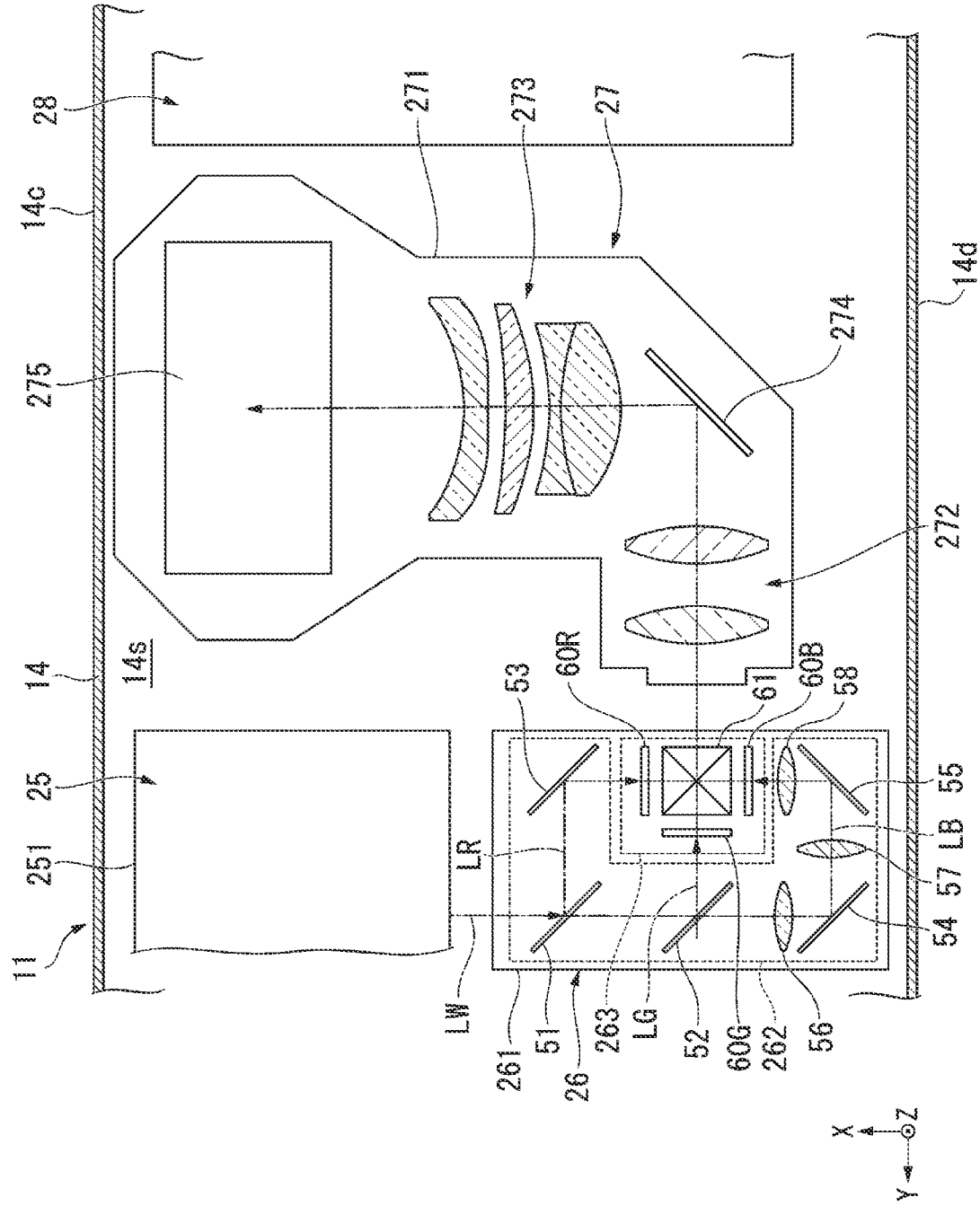
FIG. 4 is a sectional plan view of an optical system of the projector.

FIG. 4 is a sectional plan view showing a state obtained by cutting a part of the projector 11 with plane along a horizontal plane.

As shown in FIG. 4, in an internal space 14s of the housing 14, there are housed the light source unit 25, the image formation unit 26, the projection optical unit 27, and the control unit 28.

The light source unit 25 has a light source (not shown) and a light source unit housing 251 for housing the light source. The light source is formed of a discharge lamp such as a metal halide lamp, a high-pressure mercury lamp, or a super high-pressure mercury lamp, for example. It should be noted that the light source can have constituents such as a solid-state light source such as a laser source, a wavelength conversion element including a phosphor for emitting fluorescence due to excitation light from the solid-state light source, and a diffusion element for diffusing the laser beam. The light source unit 25 emits white illumination light toward the image formation unit 26.

The illumination light emitted from the light source unit 25 enters the image formation unit 26 via a uniform illumination optical system (not shown). The uniform illumination optical system is provided with a first lens array, a second lens array, a polarization conversion element, and a superimposing lens. By the illumination light emitted from the light source unit 25 passing through the uniform illumination optical system, the illuminance distribution in an image formation area of each of light modulation devices 60R, 60G, and 60B is homogenized, and at the same time, polarization directions of light beams entering the light modulation devices 60R, 60G, and 60B are uniformed. It should be noted that the uniform illumination optical system can be housed in an image formation unit housing 261 described later.

The image formation unit 26 has a color separation light guide optical system 262, an image formation module 263, and the image formation unit housing 261 for housing the color separation light guide optical system 262 and the image formation module 263.

The color separation light guide optical system 262 is provided with a first dichroic mirror 51, a second dichroic mirror 52, a first reflecting mirror 53, a second reflecting mirror 54, a third reflecting mirror 55, a first relay lens 56, a second relay lens 57, and a third relay lens 58.

The image formation module 263 is provided with the light modulation device 60R for modulating a red light beam LR, the light modulation device 60G for modulating a green light beam LG, the light modulation device 60B for modulating a blue light beam LB, and a light combining element 61 for combining the colored light beams modulated by the respective light modulation devices 60R, 60G, and 60B with each other.

The color separation light guide optical system 262 separates the white illumination light LW emitted from the light source unit 25 into the red light beam LR, the green light beam LG, and the blue light beam LB, and then guides the red light beam LR to the light modulation device 60R, guides the green light beam LG to the light modulation device 60G, and guides the blue light beam LB to the light modulation device 60B.

Between the color separation light guide optical system 262 and the light modulation device 60R, there is disposed a field lens (not shown). Between the color separation light guide optical system 262 and the light modulation device 60G, there is disposed a field lens (not shown). Between the color separation light guide optical system 262 and the light modulation device 60B, there is disposed a field lens (not shown).

In the present embodiment, the red light beam LR corresponds to light in a wavelength band of 620 nm through 810 nm. The green light beam LG corresponds to light in a wavelength band of 480 nm through 520 nm. The blue light beam LB corresponds to light in a wavelength band of 430 nm through 480 nm.

The first dichroic mirror 51 reflects the red light beam LR, and transmits the green light beam LG and the blue light beam LB. The second dichroic mirror 52 reflects the green light beam LG and transmits the blue light beam LB. The first reflecting mirror 53 reflects the red light beam LR. The second reflecting mirror 54 and the third reflecting mirror 55 reflect the blue light beam LB.

The red light beam LR having been reflected by the first dichroic mirror 51 is reflected by the first reflecting mirror 53, and is then transmitted through the field lens to enter the image formation area of the light modulation device 60R for the red light beam. The green light beam LG having been transmitted through the first dichroic mirror 51 is reflected by the second dichroic mirror 52, and is then transmitted through the field lens to enter the image formation area of the light modulation device 60G for the green light beam. The blue light beam LB which has been transmitted through the first dichroic mirror 51, and then further transmitted through the second dichroic mirror 52 enters the image formation area of the light modulation device 60B for the blue light beam via the first relay lens 56, the second reflecting mirror 54, the second relay lens 57, the third reflecting mirror 55, the third relay lens 58, and the field lens.

The light modulation device 60R, the light modulation device 60G, and the light modulation device 60B are each formed of a liquid crystal panel. The light modulation devices 60R, 60G, and 60B modulate the colored light beams having entered the light modulation devices 60R, 60G, and 60B in accordance with image information to thereby form images corresponding to the colored light beams, respectively. It should be noted that although not shown in the drawings, between the field lens and corresponding one of the light modulation device 60R, the light modulation device 60G, and the light modulation device 60B, there is disposed an incident side polarization plate. Between each of the light modulation device 60R, the light modulation device 60G, and the light modulation device 60B and the light combining element, there is disposed an exit side polarization plate.

The light combining element 61 is formed of a cross dichroic prism. The light combining element 61 combines the image light beams having respectively been emitted from the light modulation device 60R, the light modulation device 60G, and the light modulation device 60B with each other. The cross dichroic prism has a substantially square planar shape formed of four rectangular prisms bonded to each other, and on substantially X-shaped interfaces on which the rectangular prisms are bonded to each other, there are formed dielectric multilayer films.

The image light emitted from the light combining element 61 is projected by the projection optical unit 27 in an enlarged manner to form an image on the screen. In other words, the light beams respectively modulated by the light modulation device 60R, the light modulation device 60G, and the light modulation device 60B are projected on the screen by the projection optical unit 27.

The projection optical unit 27 has an anterior lens group 272 formed of a plurality of lenses, a posterior lens group 273 formed of a plurality of lenses, a mirror 274, a projection mirror 275, and a projection optical unit housing 271 for housing the anterior lens group 272, the posterior lens group 273, the mirror 274, and the projection mirror 275. A light path of the light emitted from the anterior lens group 272 is folded by the mirror 274 toward the posterior lens group 273. The projection mirror 275 is formed of a concave mirror, and reflects the light emitted from the posterior lens group 273 to project the light toward the screen. It should be noted that the light path of the projection optical unit 27 can be a light path extending on a straight line without being folded.

The control unit 28 has a circuit board, electronic components, and so on for controlling each section of the projector 11.

Figure 5:
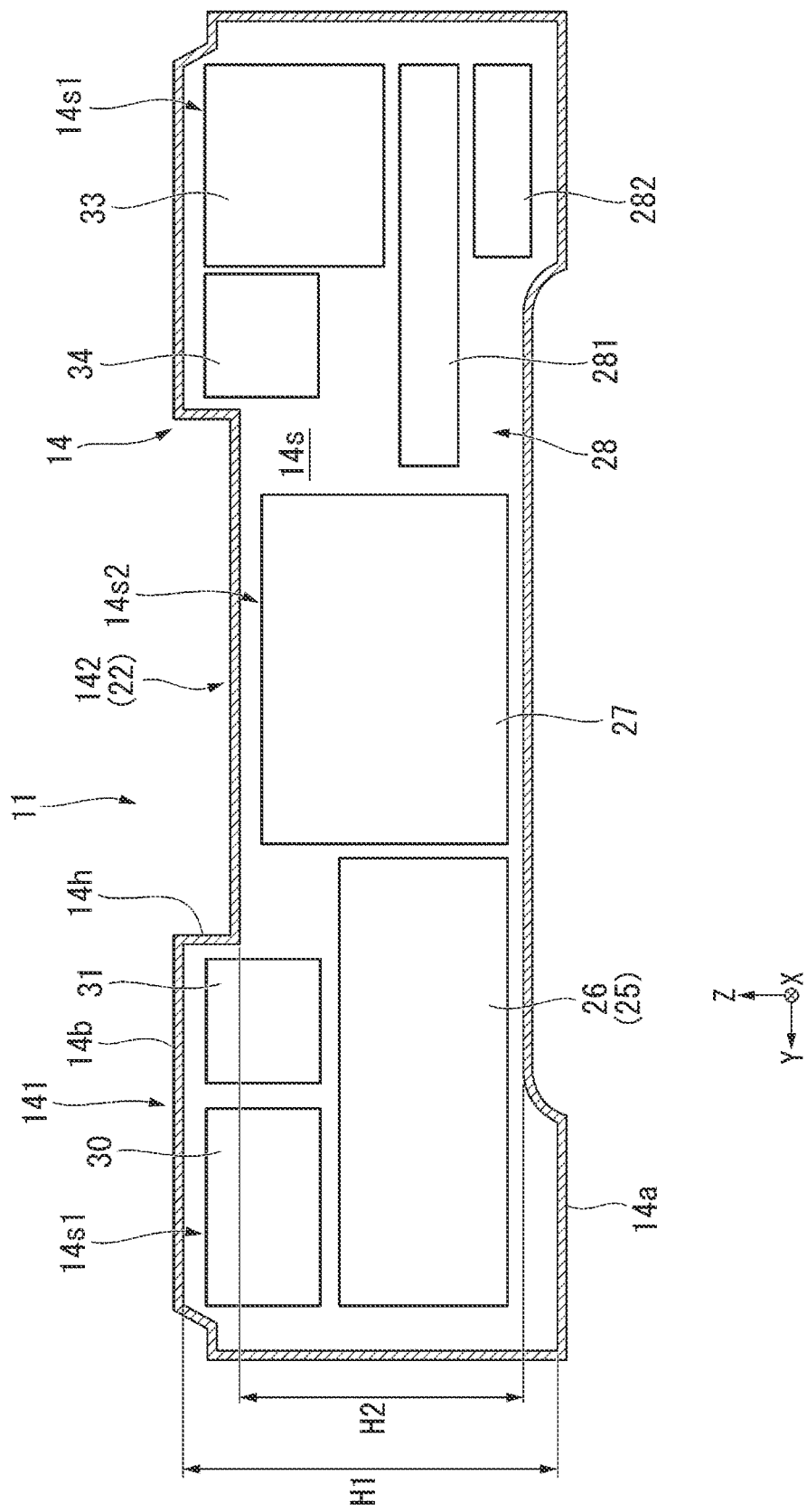
FIG. 5 is a sectional side view of the projector along the line IV-IV shown in FIG. 3.

FIG. 5 is a sectional side view of the projector 11 along the line V-V shown in FIG. 3.

As shown in FIG. 5, the internal space 14s of the housing 14 has a first internal space 14s1 overlapping the first region 141 of the bottom surface 14b, and a second internal space 14s2 overlapping the second region 142 of the bottom surface 14b when viewed from a height direction of the housing 14. In other words, a height H1 in the Z-axis direction of the first internal space 14s1 is higher than a height H2 in the Z-axis direction of the second internal space 14s2. Out of the first internal space 14s1, in an upper space located at a higher position than the second region 142, there is disposed at least a part of a constituent member housed in the internal space 14s of the housing 14.

Specifically, in the case of the present embodiment, in the second internal space 14s2, there is disposed the projection optical unit 27. Out of the first internal space 14s1, in the first internal space 14s1 located at the +Y side of the second internal space 14s2, there are disposed the constituent members such as the light source unit 25, the image formation unit 26, a heatsink 30, and a cooling fan 31. The heatsink 30 releases heat generated in the light source unit 25. The cooling fan 31 cools the image formation unit 26. The heatsink 30 and the cooling fan 31 are disposed above the light source unit 25 and the image formation unit 26. A maximum height from lower surfaces of the light source unit 25 and the image formation unit 26 to upper surfaces of the heatsink 30 and the cooling fan 31 is higher than the height of the projection optical unit 27. Therefore, in the upper space located at the higher position than the second region 142 out of the first internal space 14s1 located at the −Y side, there is disposed a part of the heatsink 30 and the cooling fan 31.

Out of the first internal space 14s1, in the first internal space 14s1 located at the −Y side of the second internal space 14s2, there are disposed the constituent members such as a first circuit board 281, a second circuit board 282, a power supply board 33, and a cooling fan 34 constituting the control unit 28. The cooling fan 34 cools the constituent members such as the first circuit board 281, the second circuit board 282, and the power supply board 33. The power supply board 33 and the cooling fan 34 are disposed above the first circuit board 281. The second circuit board 282 is disposed below the first circuit board 281. A maximum height from a lower surface of the second circuit board 282 to upper surfaces of the power supply board 33 and the cooling fan 34 is higher than the height of the projection optical unit 27. Therefore, in the upper space located at the higher position than the second region 142 out of the first internal space 14s1 located at the −Y side, there is disposed a part of the power supply board 33 and the cooling fan 34. It should be noted that it is possible to dispose the first circuit board 281 and the second circuit board 282 constituting the control unit 28 in the upper space located at the higher position than the second region 142.

As described above, in the case of the present embodiment, the projection optical unit 27 is disposed alone in the second internal space 14s2 on the one hand, but in the first internal space 14s1, any one of the light source unit 25, the image formation unit 26, and the control unit 28, and other constituent members are arranged side by side in the height direction of the housing 14 on the other hand. It should be noted that it is possible to stack the boards of the control unit 28 on the projection optical unit 27, and the boards of the control unit 28 can be disposed in at least one of the first internal space 14s1 and the second internal space 14s2.

Figure 6:
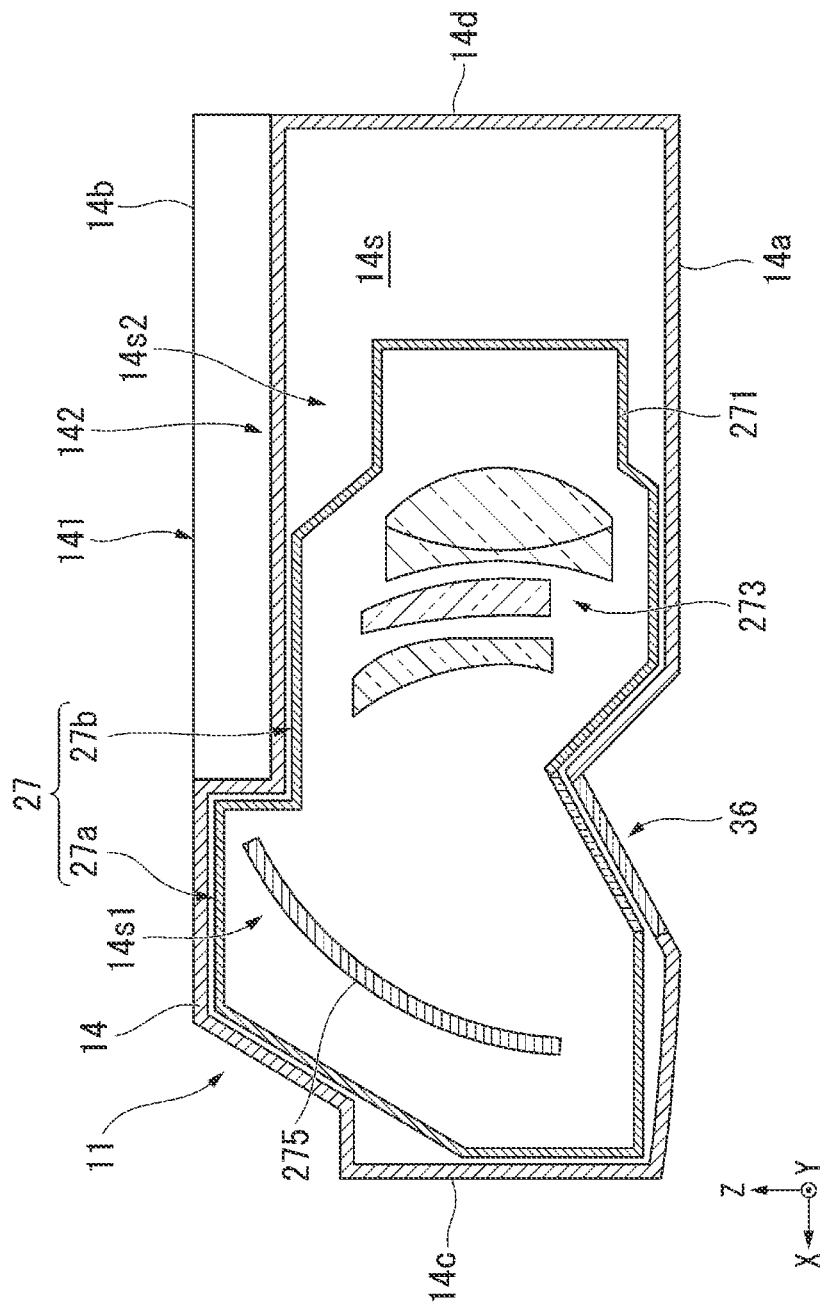
FIG. 6 is a sectional side view of the projector along the line V-V shown in FIG. 3.

FIG. 6 is a sectional side view of the projector 11 along the line VI-VI shown in FIG. 3.

As shown in FIG. 6, the projection optical unit 27 has a first outer shape part 27a protruding toward the first region 141 of the housing 14, and a second outer shape part 27b lower in height than the first outer shape part 27a. The first region 141 of the bottom surface 14b extends along the first outer shape part 27a of the projection optical unit 27, and the second region 142 of the bottom surface 14b extends along the second outer shape part 27b of the projection optical unit 27. Although not shown in the drawings, in a plan view viewed from the height direction of the housing 14, the second outer shape part 27b of the projection optical unit 27 is disposed in an area overlapping the second region 142 of the bottom surface 14b, but is not disposed in an area overlapping the first region 141.

In the X-axis direction, the projection optical unit 27 is disposed throughout an area from the first internal space 14s1 located at the +X side of the second internal space 14s2 in the first internal space 14s1 to the second internal space 14s2. When comparing the heights in the Z-axis direction of the constituent members housed inside the projection optical unit housing 271, the height in the Z-axis direction of the projection mirror 275 is higher than the heights in the Z-axis direction of any other constituent members. Therefore, the constituent members such as the posterior lens group 273 are disposed in the second internal space 14s2 corresponding to the second outer shape part 27b. The projection mirror 275 is disposed in the first internal space 14s1 corresponding to the first outer shape part 27a, and located at the +X side of the second internal space 14s2 in which the posterior lens group 273 is disposed. In the upper space located at the higher position than the second region 142 out of the first internal space 14s1 located at the +X side, there is disposed a part at an upper end side of the projection mirror 275.

Further, on the top surface 14a of the housing 14, there is disposed a window part 36 for transmitting the image light reflected by the projection mirror 275 to the outside of the housing 14. It should be noted that the window part 36 can be provided not only to the top surface 14a of the housing 14, but also to the projection optical unit 27.

Here, there is assumed a projector in a comparative example in which a recessed part is not provided to the bottom surface of the housing, but the bottom surface is made flat.

Figure 7:
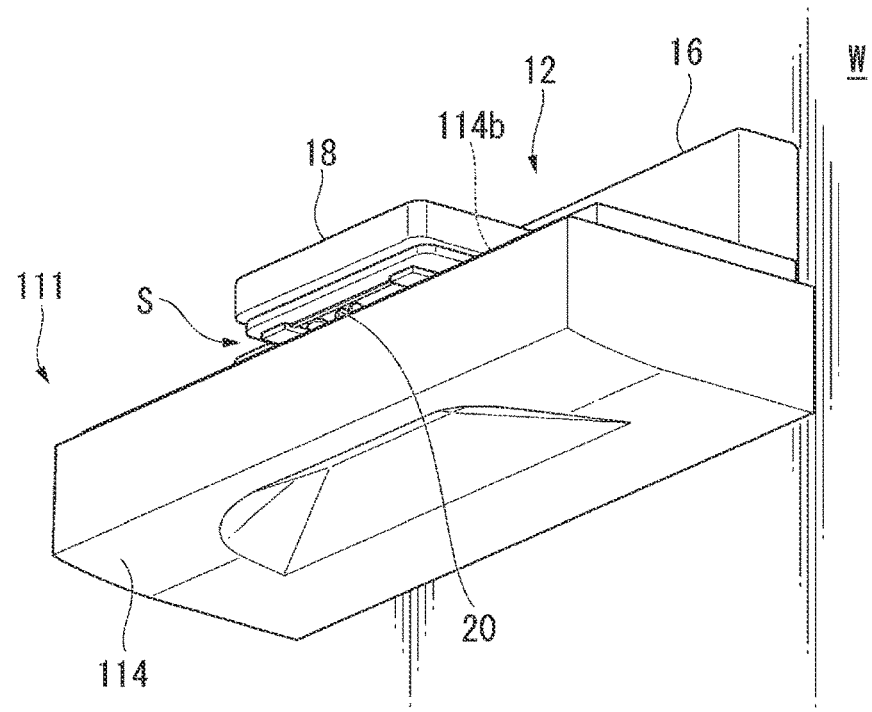
FIG. 7 is a diagram showing an installation state of a projector according to a comparative example.

FIG. 7 is a perspective view showing an installation state of a projector 111 according to the comparative example.

When installing the projector 111 according to the comparative example using the suspending attachment 12 in the present embodiment shown in FIG. 12, the bracket base (not shown) is fixed to a bottom surface 114b made flat of a housing 114. In this case, as shown in FIG. 7, since a gap S occurs between the head part 18 of the suspending attachment 12 and the housing 114, there is created the state in which the internal structure including the adjusting component 20 and so on inside the head part 18 is visible in the exterior view through the gap S. As described above, in the state in which the projector 111 according to the comparative example is installed, the appearance is poor, and the projector fails to fit into the atmosphere of the installation space for the projector 111 in some cases such as when a component made of metal can be seen.

In contrast, in the case of the projector 11 according to the present embodiment, as shown in FIG. 3, the bottom surface 14b of the housing 14 has the first region 141 and the second region 142 lower in the height from the top surface 14a than the first region 141, and the bracket base 19 of the suspending attachment 12 is fixed to the receiving part 22 disposed in the second region 142. Therefore, when installing the projector 11 according to the present embodiment on the wall surface W, the installation position of the projector 11 comes closer to the head part 18 of the suspending attachment 12, and becomes higher compared to when installing the projector 111 according to the comparative example on the wall surface W. As a result, as shown in FIG. 1, the gap between the head part 18 of the suspending attachment 12 and the housing 14 becomes smaller compared to the comparative example, and it becomes difficult for the internal structure of the head part 18 to be seen in the exterior view. Thus, according to the present embodiment, it is possible to provide the projector 11 which looks good in the installed state, and easily fits into the atmosphere of the installation space.

Further, as another method of making the internal structure of the head part 18 difficult to be seen, it is conceivable to adopt a method of providing the housing 14 with a cover for concealing the gap between the head part 18 of the suspending attachment 12 and the housing 14, but in that case, the configuration of the housing 14 becomes complicated, and there is also a possibility that the appearance becomes poor. In contrast, according to the projector 11 related to the present embodiment, since the cover for concealing the gap between the head part 18 of the suspending attachment 12 and the housing 14 is unnecessary, there is no chance for the configuration of the housing 14 to become complicated, and it is possible to provide the projector 11 having a slender exterior view.

Further, in the projector 11 according to the present embodiment, the internal space 14s of the housing 14 has the first internal space 14s1 overlapping the first region 141 of the bottom surface 14b, and the second internal space 14s2 overlapping the second region 142 when viewed from the height direction of the housing 14. In other words, the internal space 14s of the housing 14 has the first internal space 14s1 relatively high in dimension in the Z-axis direction, namely the height, and the second internal space 14s2 relatively low in height. Out of the first internal space 14s1, in the upper space located at the higher position than the second region 142, there is disposed at least a part of the constituent member housed in the internal space 14s of the housing 14.

According to this configuration, it is possible to effectively use the upper space of the first internal space 14s1 for the housing of the constituent member in addition to the fact that the appearance when installing the projector 11 is improved, and it is possible to achieve reduction in height of the projector 11.

In particular in the case of the present embodiment, the heatsink 30 and the cooling fan 31 are disposed so as to be stacked above the light source unit 25 and the image formation unit 26 in the first internal space 14s1 located at the +Y side of the second internal space 14s2, and in the first internal space 14s1 located at the −Y side, there are disposed the power supply board 33 and the cooling fan 34 so as to be stacked above the first circuit board 281 and the second circuit board 282. As described above, the plurality of constituent members are arranged side by side along the height direction in the first internal space 14s1.

According to this configuration, it is possible to efficiently dispose the plurality of constituent members effectively using the first internal space 14s1 relatively high in height. In particular, the constituent members such as the heatsink 30, the cooling fan 31, and the power supply board 33 to be disposed in the upper part of the first internal space 14s1 are not subject to the optical restriction in arrangement, and are therefore effective as the constituent members to be disposed in the upper part of the first internal space 14s1.

Further, in the case of the present embodiment, the projection optical unit 27 is disposed throughout the first internal space 14s1 located at the +X side of the second internal space 14s2 and the second internal space 14s2, and the housing 14 has the shape in which the first region 141 of the bottom surface 14b extends along the first outer shape part 27a of the projection optical unit 27, and the second region 142 extends along the second outer shape part 27b of the projection optical unit 27.

According to this configuration, it is possible to efficiently dispose the projection optical unit 27 as the constituent member relatively large in size inside the housing 14, and at the same time, it is possible to narrow the gap between the housing 14 and the projection optical unit 27 as small as possible, and thus, it is possible to suppress the growth in size of the housing 14.

Further, in the projector 11 according to the present embodiment, the second region 142 is disposed in the central portion in the horizontal direction as the longitudinal direction of the housing 14, the first region 141 is disposed at the both sides of the second region 142, the light source unit 25, the image formation unit 26, and so on are disposed in the first internal space 14s1 located at the +Y side, and the control unit 28 and so on are disposed in the first internal space 14s1 located at the −Y side.

According to this configuration, since the light source unit 25 and the image formation unit 26, and the control unit 28 are separately disposed in the first internal space 14s1 located at the both sides of the second internal space 14s2 in which the projection optical unit 27 is housed, it is possible to achieve the effective use of the internal space 14s of the housing 14.

The projection system 10 according to the present embodiment is provided with the projector 11 according to the present embodiment and the suspending attachment 12, and is therefore good in the appearance in the state of installing the projector 11, and easily fits into the atmosphere of the installation space.

Second Embodiment

A second embodiment of the present disclosure will hereinafter be described using FIG. 8 through FIG. 11.

The second embodiment is substantially the same in basic configurations of a projector and a projection system as the first embodiment, and is different in configurations of a housing and a suspending attachment from the first embodiment. Therefore, the description of the basic configurations of the projector and the projection system will be omitted.

Figure 8:
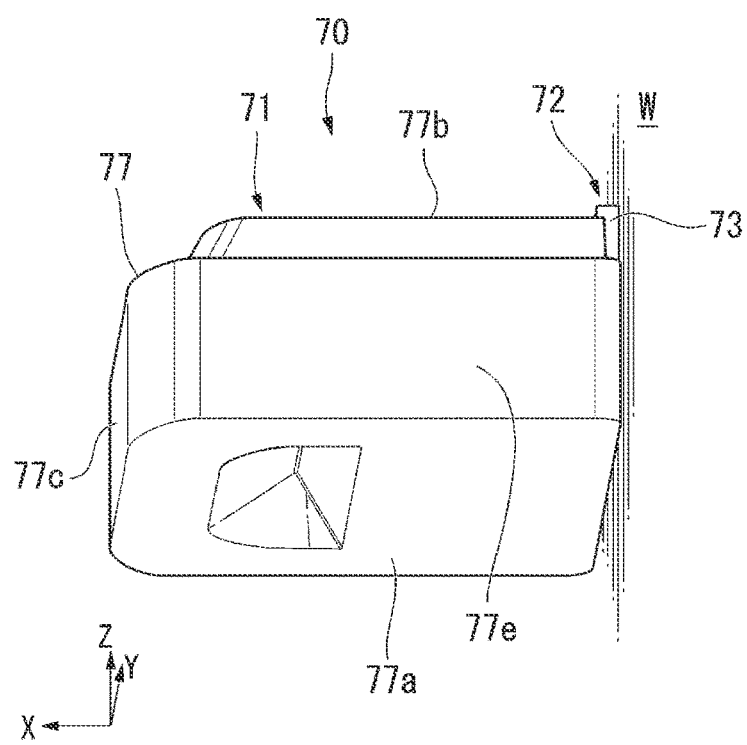
FIG. 8 is a perspective view showing an installation state of a projector according to a second embodiment.
Figure 9:
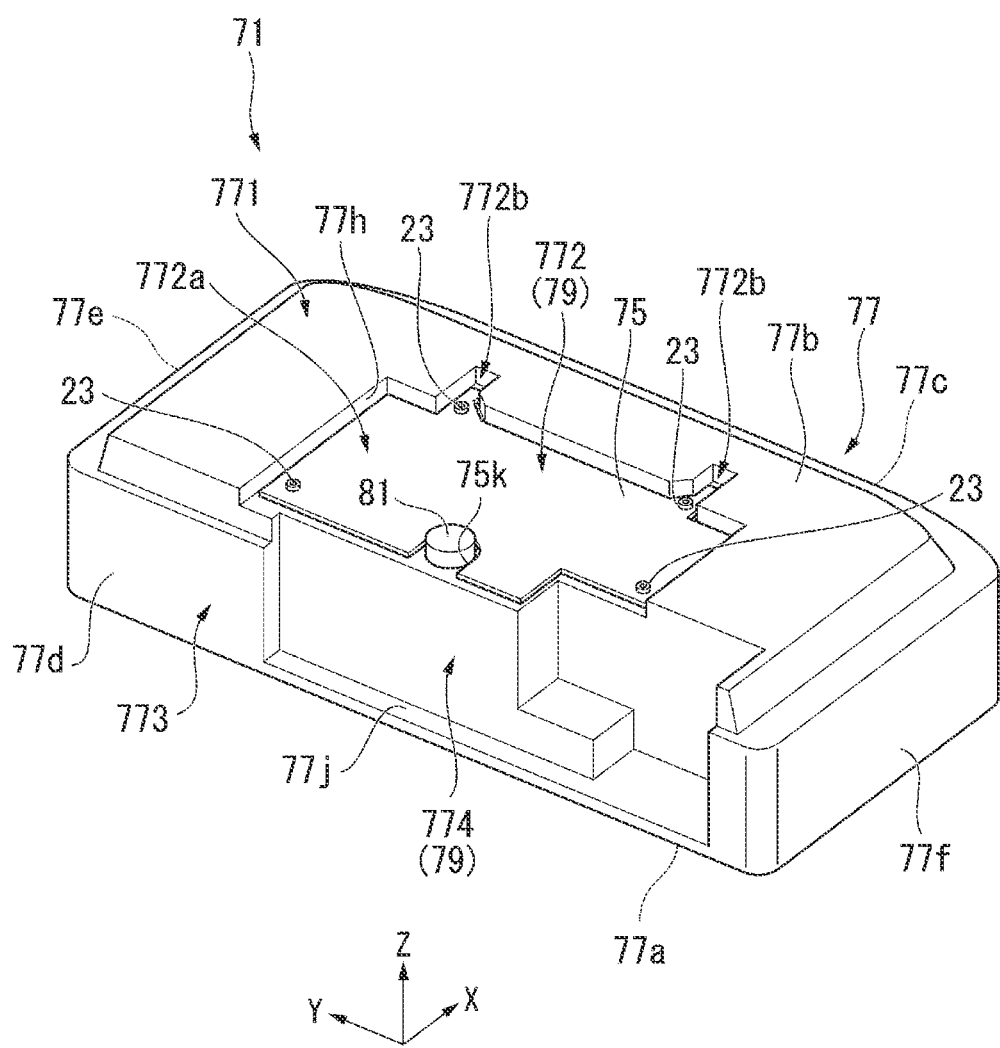
FIG. 9 is a perspective view of the projector.
Figure 10:
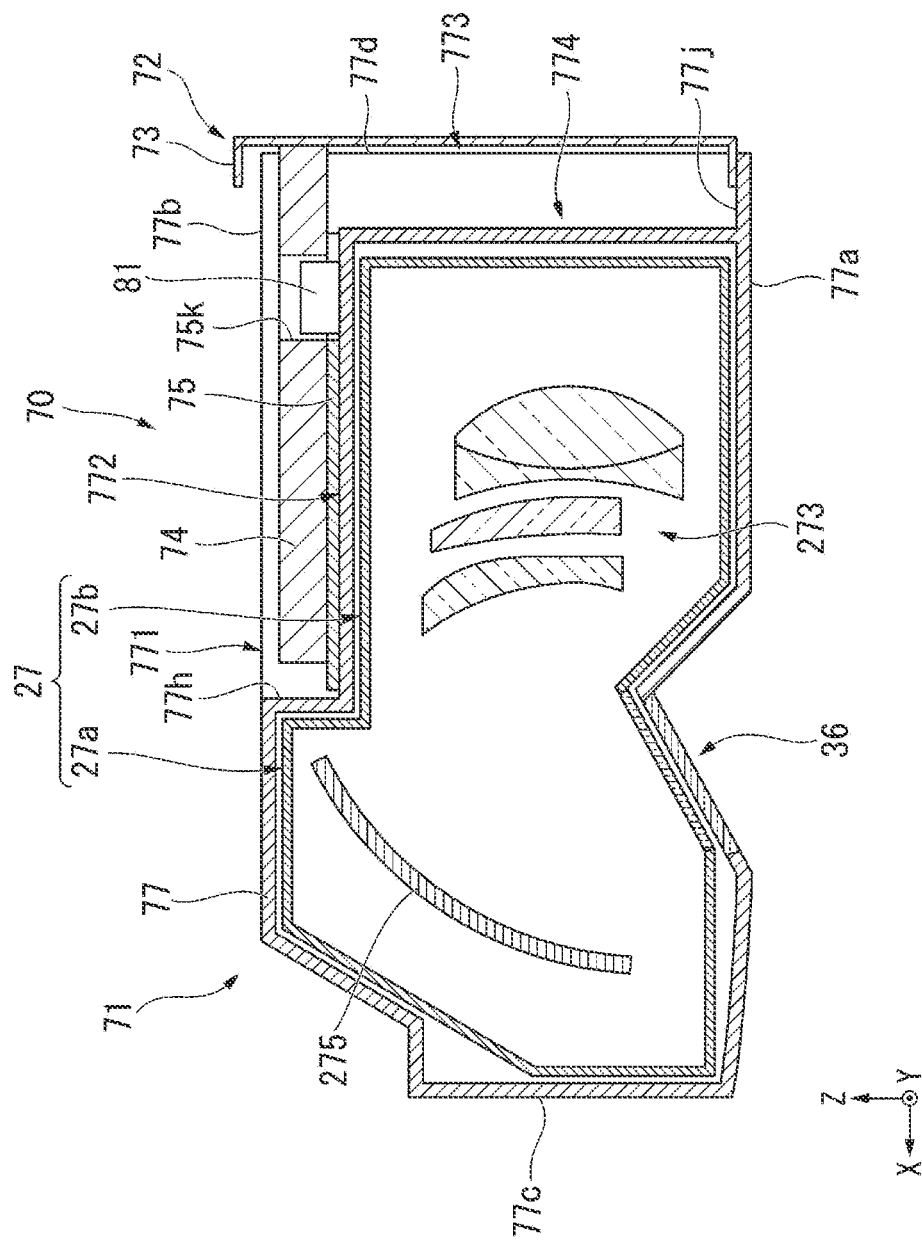
FIG. 10 is a sectional side view of the projector along the line IX-IX shown in FIG. 7.

FIG. 8 is a perspective view of a projection system 70 according to the present embodiment. FIG. 9 is a perspective view of a projector 71. FIG. 10 is a sectional side view of the projector 71 along the line IX-IX shown in FIG. 7.

In FIG. 8 through FIG. 11, the constituents common to the drawings used in the first embodiment are denoted by the same reference symbols, and the description thereof will be omitted.

As shown in FIG. 8, the projection system 70 according to the present embodiment is provided with the projector 71 and a suspending attachment 72 for suspending the projector 71. As shown in FIG. 10, the suspending attachment 72 has a support plate 73 to be fixed to the wall surface W, a support arm 74 which is coupled to the support plate 73, and extends in the front-back direction, and a bracket base 75 disposed on a lower surface of a tip portion of the support arm 74.

The support plate 73 in the present embodiment corresponds to a second support part in the appended claims. The support arm 74 and the bracket base 75 in the present embodiment correspond to a first support part in the appended claims. The support arm 74 and the bracket base 75 are not only formed of separate members, but can also be formed of a single member.

As shown in FIG. 9, similarly to the first embodiment, a housing 77 has six surfaces consisting of a top surface 77a, a bottom surface 77b, a front surface 77c, a back surface 77d, a right side surface 77e, and a left side surface 77f. The bottom surface 77b is provided with a first recessed part 77h. Thus, the bottom surface 77b has a first region 771 corresponding to a portion other than the first recessed part 77h, and a second region 772 which corresponds to the first recessed part 77h, and is lower in height from the top surface 77a than the first region 771. It should be noted that the top surface 77a can be a flat surface, or can also be a surface having an asperity.

The back surface 77d in the present embodiment corresponds to a third surface in the appended claims. The front surface 77c in the present embodiment corresponds to a fourth surface in the appended claims.

Further, in the case of the present embodiment, the back surface 77d of the housing 77 is provided with a second recessed part 77j. Thus, the back surface 77d has a third region 773 communicated with the first region 771, and a fourth region 774 which is communicated with the second region 772, and is shorter in distance from the front surface 77c than the third region 773. The third region 773 corresponds to a portion other than the second recessed part 77j, and the fourth region 774 corresponds to the second recessed part 77j. It should be noted that the front surface 77c can be a flat surface, or can also be a surface having an asperity. When the front surface 77c has the asperity, a distance to the back surface 77d based on a portion which occupies the largest area except the asperity out of the front surface 77c is defined as the distance from the front surface 77c.

A receiving part 79 on which the suspending attachment 72 is mounted is disposed throughout the second region 772 and the fourth region 774. In FIG. 9, the bracket base 75 of the suspending attachment 72 is fixed to the receiving part 79 of the second region 772 with the fixation members 23. The second region 772 is disposed in a substantially central portion in a longitudinal direction of the housing 77, namely a horizontal direction. The first region 771 is disposed at a right hand side, a left hand side, and a front side of the second region 772. Further, the second region 772 has a shape constituted by a rectangular part 772a, and two protruding parts 772b protruding from the vicinity of each of the corner portions ahead of the rectangular part 772a at the right and left sides frontward so as to form triangular shapes. It should be noted that the shapes of the two protruding parts 772b are not limited to the triangular shapes.

The bracket base 75 has a shape substantially coinciding with the rectangular part 772a and the two protruding parts 772b of the second region 772. The bracket base 75 is fixed to the bottom surface 77b of the housing 77 with the fixation members 23 at four places, namely the vicinity of the right rear corner portion of the second region 772, the vicinity of the left rear corner portion thereof, the protruding part at the right side, and the protruding part at the left side. As the fixation members 23, there are used screws, for example, but this is not a limitation. Further, the number and the arrangement of the fixation places of the bracket base 75 are not particularly limited.

In the second region 772 of the bottom surface 77b, there is disposed a leg part 81 for supporting the housing 77 when installing the projector 71. The leg part 81 has a columnar shape. The leg part 81 is disposed at the rear side in a substantially central portion in the horizontal direction of the housing 77, namely in the vicinity of the back surface 77d, in the second region 772. The height of a bottom surface of the leg part 81 substantially coincides with the height of the first region 771. The bracket base 75 has a cut-out part 75k at a place corresponding to the leg part 81, and is disposed so as to surround the leg part 81. It should be noted that the leg part 81 is disposed only in the second region 772 in this example, but can be disposed in the first region 771 in addition to the second region 772, and it is possible to adopt a configuration in which the housing 77 is supported by the plurality of leg parts 81.

As shown in FIG. 10, the support arm 74 of the suspending attachment 72 is disposed in the first recessed part 77h disposed on the bottom surface 77b of the housing 77, and is located above the second region 772. Further, the support plate 73 of the suspending attachment 72 is disposed in the second recessed part 77j disposed on the back surface 77d of the housing 77, and is located in the rear of the fourth region 774. Specifically, the suspending attachment 72 has the support arm 74 to be coupled to the receiving part 79 disposed in the second region 772, and the support plate 73 which crosses the support arm 74, and is coupled to the receiving part 79 disposed in the fourth region 774.

Figure 11:
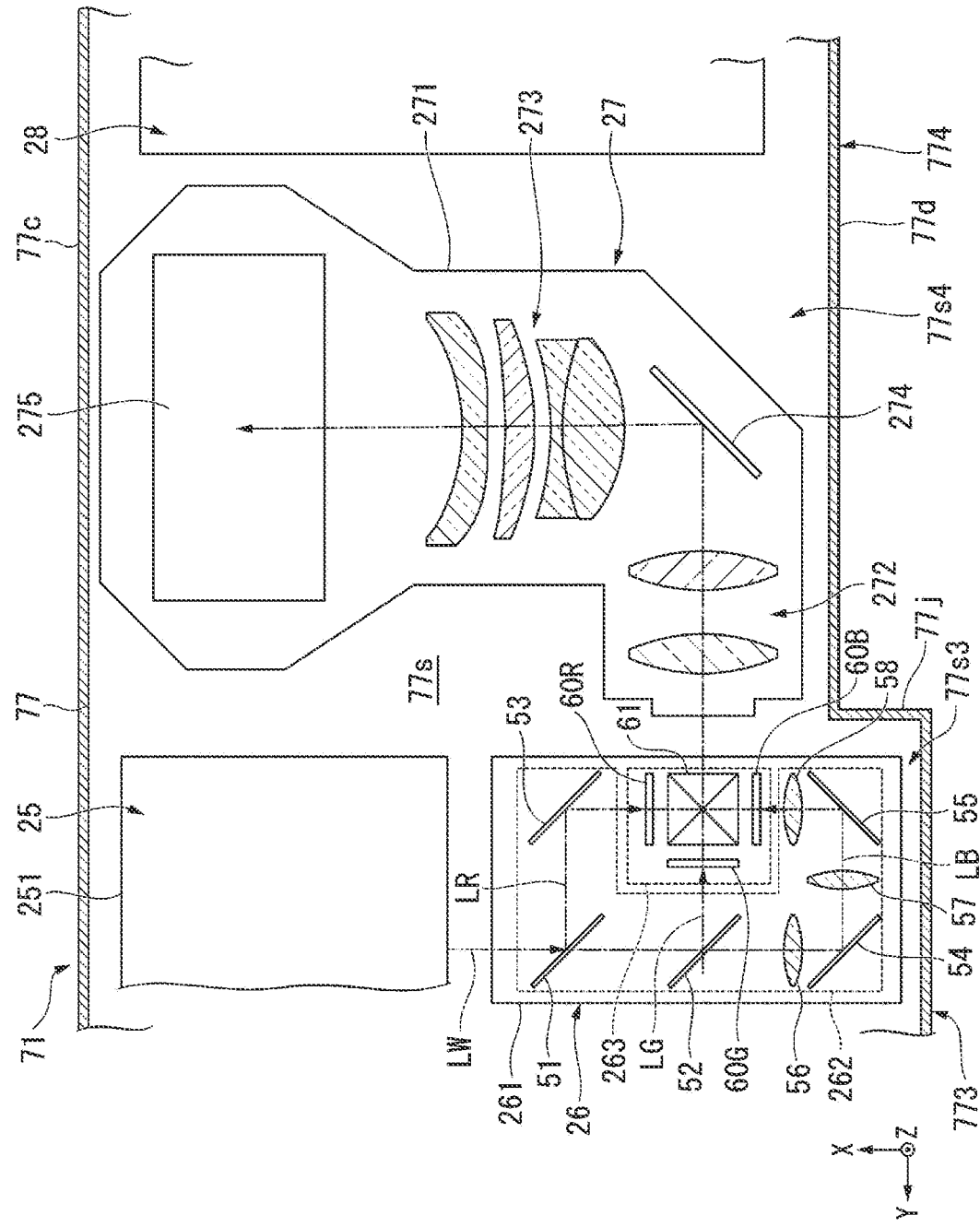
FIG. 11 is a sectional plan view of an optical system of the projector.

As shown in FIG. 11, in the present embodiment, the constituent members such as the second dichroic mirror 52, the light modulation device 60G for the green light beam, and the light combining element 61 of the image formation unit 26 are disposed on the optical axis of the anterior lens group 272 of the projection optical unit 27. In contrast, the constituent members such as the second reflecting mirror 54, the second relay lens 57, and the third reflecting mirror 55 of the image formation unit 26 are disposed at the rear side (the −X side) of the anterior lens group 272 of the projection optical unit 27. Due to such a positional relationship, a rear end portion of the image formation unit 26 protrudes to backward of a rear end portion of the projection optical unit 27.

An internal space 77s of the housing 77 has a third internal space 77s3 overlapping the third region 773 and a fourth internal space 77s4 overlapping the fourth region 774 when viewed from a normal direction of the back surface 77d. In other words, the dimension in the front-back direction (the X-axis direction) of the third internal space 77s3 is larger than the dimension in the front-back direction (the X-axis direction) of the fourth internal space 77s4. Therefore, in a space located at a position protruding backward from the fourth region 774 out of the third internal space 77s3, there is disposed a portion where the constituent members such as the second reflecting mirror 54, the second relay lens 57, and the third reflecting mirror 55 of the image formation unit 26 are disposed.

The rest of the configuration of the projector 71 is substantially the same as the configuration of the projector 11 according to the first embodiment.

The projection system 70 according to the present embodiment is provided with the projector 71 and the suspending attachment 72 for suspending the projector 71, and the suspending attachment 72 has the support arm 74 to be coupled to the receiving part 79 disposed in the second region 772, and the support plate 73 which crosses the support arm 74, and is disposed in the receiving part 79 disposed in the fourth region 774. It should be noted that the support plate 73 can directly or indirectly be fixed to the receiving part 79 disposed in the fourth region 774 with the fixation members.

Also in the present embodiment, it is possible to obtain substantially the same advantages as those of the first embodiment such as an advantage that it is possible to provide the projector 71 which is good in appearance in the installed state, and easily fits into the atmosphere of the installation space without making the structure of the housing 77 complicated, and an advantage that it is possible to achieve reduction in size of the projector 71 by effectively using the internal space of the housing 77 for housing the constituent members.

Further, the projector 71 according to the present embodiment has the configuration in which the second recessed part 77j is provided to the back surface 77d of the housing 77, and a part of the support plate 73 of the suspending attachment 72 is housed inside the second recessed part 77j. According to this configuration, as shown in FIG. 8, the support plate 73 becomes difficult to be seen in the exterior view in addition to the support arm 74, and the projector 71 becomes easier to fit into the atmosphere of the installation space.

Further, in the projector 71 according to the present embodiment, a part of the image formation unit 26 is disposed in the space located at the position protruding to backward of the fourth region 774 out of the third internal space 77s3. According to this configuration, the space at the rear side formed by providing the second recessed part 77j to the back surface 77d can effectively be used for housing the constituent members, and thus, it is possible to suppress an increase in size in the front-back direction of the projector 71.

Further, in the projector 71 according to the present embodiment, the leg part 81 is disposed in the second region 772 of the bottom surface 77b of the housing 77. According to this configuration, since the leg part 81 supports the housing 77 together with the first region 771 when installing the projector 71, it is possible to stably install the projector 71 even in the configuration in which the first recessed part 77h is provided to the bottom surface 77b. It should be noted that it is possible for the leg part 81 to be provided to the projector 11 according to the first embodiment.

It should be noted that the scope of the present disclosure is not limited to the embodiments described above, but a variety of modifications can be provided thereto within the scope or the spirit of the present disclosure.

For example, although the example in which the constituent members such as the heatsink, the cooling fan, and the power supply board are disposed in the upper part of the first internal space of the housing is cited in the embodiments described above, it is possible to dispose any of the variety of constituent members in the light source unit, the image formation unit, the projection optical unit, and the control unit instead of these constituent members.

Further, although the example in which the present disclosure is applied to the ultrashort focal distance type projector having the projection optical unit provided with the projection mirror is shown in the embodiments described above, it is possible to apply the present disclosure to a projector other than the ultrashort focal distance type projector.

Further, it is possible to apply the projection device according to the present embodiment to a projector provided with a light modulation device formed of a reflective liquid crystal panel or a digital micromirror device, or a single panel type projector provided with a single light modulation device.

Further, although there is cited the example of fixing the projector to the wall surface via the suspending attachment in the embodiments described above, it is possible to apply the present disclosure to the projection system having a configuration of fixing the projector to the ceiling via the suspending attachment. Also in this case, only the configuration of the suspending attachment to be attached to the ceiling is different from those of the embodiments described above, and it is possible to use substantially the same projector as in the embodiments described above.

Further, the number, the arrangement, the shapes, the dimensions, the constituent materials, and so on of the constituents constituting the projector and the projection system according to the embodiments described above are not limited to the illustration of the embodiments described above, but can arbitrarily be modified.

A projection device according to an aspect of the present disclosure may have the following configuration.

The projection device according to an aspect of the present disclosure includes a light source unit, an image formation unit, a projection optical unit, and a housing which has a first surface and a second surface opposed to each other, and is configured to house the light source unit, the image formation unit, and the projection optical unit, wherein the first surface includes a first region, and a second region lower in height from the second surface than the first region, and a receiving part on which a suspending attachment is mounted is disposed in the second region.

In the projection device according to the above aspect of the present disclosure, defining a perpendicular direction of the first surface and the second surface as a height direction of the housing, an internal space of the housing may have a first internal space overlapping the first region viewed from the height direction of the housing, and a second internal space overlapping the second region viewed from the height direction of the housing, and at least a part of a constituent member housed in the internal space of the housing may be disposed in an upper space located at a position higher than the second region out of the first internal space.

In the projection device according to the above aspect of the present disclosure, a plurality of constituent members constituting any of the light source unit, the image formation unit, and the projection optical unit may be disposed in the first internal space so as to be arranged side by side in the height direction.

In the projection device according to the above aspect of the present disclosure, the projection optical unit may have a first outer shape part protruding toward the first region, and a second outer shape part lower in height than the first outer shape part, the first region may be along the first outer shape part of the projection optical unit, and the second region may be along the second outer shape part of the projection optical unit.

In the projection device according to the above aspect of the present disclosure, the second outer shape part of the projection optical unit is disposed in an area overlapping the second region when viewed from the height direction of the housing.

The projection device according to the above aspect of the present disclosure further may include a heatsink configured to cool the light source unit, wherein at least a part of the heatsink may be disposed in the upper space.

The projection device according to the above aspect of the present disclosure may further include a cooling fan configured to cool an inside of the housing, wherein at least a part of the cooling fan may be disposed in the upper space.

The projection device according to the above aspect of the present disclosure may further include a control unit configured to control the light source unit, the image formation unit, and the projection optical unit, wherein at least a part of the control unit may be disposed in the upper space.

In the projection device according to the above aspect of the present disclosure, the second region may be disposed in a central portion of the housing, and the first region may be disposed in one end portion and another end portion with respect to the central portion when viewed from the height direction of the housing, and any of the light source unit, the image formation unit, the projection optical unit, and the control unit may be disposed in the first internal space at the one end portion side, and another of the units may be disposed in the first internal space at the another end portion side.

In the projection device according to the above aspect of the present disclosure, a leg part configured to support the housing when installing the projection device may be disposed in the second region.

In the projection device according to the above aspect of the present disclosure, the housing may further include a third surface and a fourth surface which cross the first surface and the second surface, and are opposed to each other, the third surface may have a third region communicated with the first region, and a fourth region which is communicated with the second region and is shorter in distance from the fourth surface than the third region, and the receiving part may be disposed in the second region and the fourth region.

In the projection device according to the above aspect of the present disclosure, the internal space of the housing may include a third internal space overlapping the third region when viewed from a normal direction of the third surface, and a fourth internal space overlapping the fourth region when viewed from the normal direction of the third surface, and a part of any of the light source unit, the image formation unit, and the projection optical unit may be disposed in a space located at a position protruding toward the normal direction of the third surface from the fourth region out of the third internal space.

The projection system according to an aspect of the present disclosure includes the projection device according to the above aspect of the present disclosure, and the suspending attachment configured to suspend the projection device.

The projection system according to another aspect of the present disclosure includes the projection device according to the above aspect of the present disclosure, and the suspending attachment configured to suspend the projection device, wherein the suspending attachment includes a first support part to be coupled to the receiving part disposed in the second region, and a second support part which crosses the first support part, and is coupled to the receiving part disposed in the fourth region.

What is claimed is:
1. A projection device comprising:
a light source unit;
an image formation unit;
a projection optical unit; and
a housing which has a first surface and a second surface opposed to each other, a third surface and a fourth surface which cross the first surface and the second surface, and are opposed to each other, a fifth surface and a sixth surface which cross the first surface, the second surface, the third surface and the fourth surface, and are opposed to each other, and is configured to house the light source unit, the image formation unit, and the projection optical unit, wherein
defining a perpendicular direction of the first surface and the second surface as a height direction of the housing, a perpendicular direction of the third surface and the fourth surface as a width direction of the housing, and a perpendicular direction of the fifth surface and the sixth surface as a length direction of the housing,
a length of the length direction of the housing is longer than a length of the width direction of the housing,
an image light exits from the projection optical unit toward the fourth surface side,
the first surface includes a first region, and a second region lower in height from the second surface than the first region,
the first region is located between the third surface side, the fifth surface side, and the sixth surface side with respect to the second region such that the first region surrounds the second region on a third surface side of the second region, a fifth surface side of the second region, and a sixth surface side of the second region,
the second region is continuous to the fourth surface, and
a receiving part, on which a suspending attachment is mounted, is disposed in the second region.
2. The projection device according to claim 1, wherein
an internal space of the housing has a first internal space overlapping the first region viewed from the height direction of the housing, and a second internal space overlapping the second region viewed from the height direction of the housing, and
at least a part of a constituent member housed in the internal space of the housing is disposed in an upper space located at a position higher than the second region out of the first internal space.
3. The projection device according to claim 2, wherein
a plurality of constituent members constituting any of the light source unit, the image formation unit, and the projection optical unit are disposed in the first internal space so as to be arranged side by side in the height direction.
4. The projection device according to claim 2, wherein
the projection optical unit has a first outer shape part protruding toward the first region, and a second outer shape part lower in height than the first outer shape part,
the first region is along the first outer shape part of the projection optical unit, and
the second region is along the second outer shape part of the projection optical unit.

5. The projection device according to claim 4, wherein the second outer shape part of the projection optical unit is disposed in an area overlapping the second region when viewed from the height direction of the housing.

6. The projection device according to claim 2, further comprising:
a heatsink configured to cool the light source unit, wherein
at least a part of the heatsink is disposed in the upper space.

7. The projection device according to claim 2, further comprising:
a cooling fan configured to cool an inside of the housing, wherein
at least a part of the cooling fan is disposed in the upper space.

8. The projection device according to claim 2, further comprising:
a control unit configured to control the light source unit, the image formation unit, and the projection optical unit, wherein
at least a part of the control unit is disposed in the upper space.

9. The projection device according to claim 8, wherein the second region is disposed in a central portion of the housing, and the first region is disposed at one end portion side and another end portion side with respect to the central portion when viewed from the height direction of the housing, and
any of the light source unit, the image formation unit, the projection optical unit, and the control unit is disposed in the first internal space at the one end portion side, and another of the units is disposed in the first internal space at the another end portion side.

10. The projection device according to claim 1, wherein a leg part configured to support the housing when installing the projection device is disposed in the second region.

11. The projection device according to claim 1, wherein the third surface has a third region communicated with the first region, and a fourth region which is communicated with the second region and is shorter in distance from the fourth surface than the third region, and
the receiving part is disposed in the second region and the fourth region.

12. The projection device according to claim 11, wherein the internal space of the housing includes a third internal space overlapping the third region when viewed from a normal direction of the third surface, and a fourth internal space overlapping the fourth region when viewed from the normal direction of the third surface, and
a part of any of the light source unit, the image formation unit, and the projection optical unit is disposed in a space located at a position protruding toward the normal direction of the third surface from the fourth region out of the third internal space.

13. A projection system comprising:
the projection device according to claim 1; and
a suspending attachment configured to suspend the projection device.

14. A projection system comprising:
the projection device according to claim 11; and
a suspending attachment configured to suspend the projection device, wherein
the suspending attachment includes
a first support part to be coupled to the receiving part disposed in the second region, and
a second support part which crosses the first support part, and is disposed on the receiving part disposed in the fourth region.

15. The projection device according to claim 4, wherein the second surface of the housing has a window that the image light exits toward the fourth surface side, and
the projection optical unit has a group of lenses disposed in the second internal space, and a projection mirror disposed in the first internal space and reflecting the image light transmitted through the group of lenses toward the window.

* * * * *